United States Patent Office 2,879,263
Patented Mar. 24, 1959

2,879,263

POLYMERIZATION PROCESS

Arthur William Anderson and Manville Isager Bro, Wilmington, Del., assignors to E. I. du Pont de Nemours and Company, Wilmington, Del., a corporation of Delaware No Drawing. Application February 1, 1955
Serial No. 485,616

12 Claims. (Cl. 260—94.9)

This invention relates to a polymerization process which is highly valuable for the production of solid ethylene polymers, and particularly to promotion in polymerization reactions.

Heretofore it had been known that ethylene can be converted to solid polymers under very high pressures in the presence of catalysts which are capable of yielding free radicals under polymerization conditions. Recently a novel polymerization catalyst had been described in copending application S. N. 450,243, filed August 16, 1954, in which a reduced titanium metal complex is disclosed as a catalyst which produces extremely high molecular weight, substantially unbranched polymers and copolymers of ethylene. This active titanium complex is formed by reducing a tetravalent or trivalent titanium salt or ester to a valence state below three, and combining the reduced product with an ethylenically unsaturated hydrocarbon. The initiator thus formed is effective for the polymerization of said unsaturated hydrocarbon to high molecular weights. This type of catalyst has been called a coordination catalyst, because it is believed that the reduced titanium will coordinate with the ethylenically unsaturated compound and cause polymerization. The reduction of the tetra- or trivalent titanium to a valence state below three is accomplished by strong reducing agents such as metallo-organic compounds, metal hydrides, Grignard reagents and metals such as zinc and metals above zinc in the electromotive series. The polymers obtained by this type of polymerization are characterized by their linear structure. The linear polyethylene thus obtained has virtually no side branches such as methyl substitution and a very small number of vinylidene groups. Polyethylenes obtained by this method have extremely high molecular weights and usually are of higher density than polymers made by well-known free radical polymerization processes. The fact that the coordination initiator system gives rise to a type of polymer which differs from that obtained by the previously known free radical polymerization system can be explained by the theory, which as yet has not been completely established and verified, that the titanium when reduced to a valence state below three reacts with ethylene to form a chain generating nucleus which is capable of combining continuously with ethylene monomer units which enter between the nucleus and the growing chain. In contrast with this, in the previously known free radical polymerization the initiating free radical remains at the inactive end of the growing polymeric chain. The coordination initiator system has been found to be useful over a wide range of temperature and pressure, and is, therefore, a highly valuable system for polymerizing ethylene.

As stated hereinabove, metals in the electromotive series which are above zinc, such as alkali metals, are reducing agents for titanium, capable of reducing titanium from a valence state above three to one below three. The reaction mechanism by which this reduction occurs has at the present time not been established. In comparison with other reducing agents useful in the reduction of titanium, the alkali metals were found to be less active than certain other reducing agents such as metallo-organic compounds, e. g. lithium aluminum alkyls. Because of their availability, low cost and stability, as compared with the metallo-organic derivatives, alkali metals would be a preferred reducing agent in polymerization systems using coordination initiators if methods could be found for increasing the activity of such systems.

It is, therefore, one of the objectives of this invention to increase the reactivity of coordination initiator systems using alkali metals as reducing agents. A further object is to provide highly reactive initiator systems for the polymerization of ethylene to high molecular weight polymers. Another object of this invention is to provide an improved polymerization system using a coordination initiator. Further objects will become apparent hereinafter.

It has now been discovered that the addition of small quantities of acetylenic hydrocarbons and substituted ethylenically unsaturated hydrocarbon to coordination initiator systems employing alkali metals as reducing agents give a surprising increase in the reactivity of the initiators when used in the polymerization and copolymerization of ethylene to high molecular weight solid polymers. The invention is described mainly with regard to titanium coordination initiators, which, although preferred, are not the only coordination initiators useful in the present invention. Other metals useful in coordination initiators are described hereinbelow in greater detail. The reason for this surprising increase of reactivity of the initiator system by the addition of compounds of the class stated hereinabove is not known, although it is believed that the activators aid in the reduction of the titanium to a valence state of below three. In the absence of sodium, no solid polymer is formed. Furthermore, no substantial polymerization of ethylene occurs in the absence of the tetravalent titanium halide. In the absence of the activator, the polymerization of ethylene is sluggish. In the presence of all three components, however, a highly reactive initiator system is formed. Possibly the improved activity is due to a reaction of the alkali metal with the activator in the presence of the tetra- or trivalent titanium salt, such as titanium tetrachloride, this intermediate then reacts with the titanium compound forming an unstable titanium alkyl (or alkenyl) trichloride or titanium alkyl (or alkenyl) dichloride, or some related structure; such structures may decompose rapidly, reducing the titanium to a valence state below three, whereupon the titanium can coordinate with ethylene and cause the polymerization to proceed. The reduction of the titanium to a valence state below three, although possible in the presence of the alkali metal above, apparently becomes much easier when this titanium mono- or dialkyl (or alkenyl) halide is formed with the activator. However, it should be realized that this is only one explanation of the facts and that others will occur to those skilled in the art. The higher electron density due to the unsaturation of the activators of this invention is believed to aid in the reduction of the titanium. This tends to explain the extreme reactivity of initiator systems using acetylene in combination with an alkali metal.

The activators used in the present invention, as described hereinabove, are hydrocarbons containing either a triple bond or a substituted double bond. The preferred compounds, because of their greatest effect on the titanium tetrahalide sodium initiating system, are acetylene and substituted acetylenes. The substituted ethylenes are also highly useful as activators. They greatly increase the rate of polymerization as shown by the subsequent examples but they are slightly less active than the acetylenes. Ethylene itself is not an effective activator for the reduction of the titanium. The olefins useful as activators for the coordination polymerization of ethylene in a titanium alkali-metal system includes the mono-, di-, tri-, or tetra-substituted olefins. The substitution may consist of alkyl radicals or aromatic radicals. Cyclic olefins such as cyclohexene are equally useful. Preferably, the alkyl radicals are those having from 1 to 10 carbon atoms. Olefins, as well as diolefins, such as butadiene, may be used to activate the initiator system. Suitable examples include propylene, isobutylene, hexenes, styrene, decenes, etc.

In some instances, it was found that part of the activator had copolymerized with the resulting ethylene polymer. This can occur when an excess of the activator is present during the reduction. Another explanation may be that on reduction of the titanium the activator is restored to its original structure.

The polymerization reaction is preferably carried out in an inert liquid reaction medium such as a saturated hydrocarbon or an aromatic hydrocarbon. Preferred reaction media are benzene, toluene and cyclohexane. To achieve a rapid formation of the catalytically active complex, it is preferred to employ solutions of the catalyst components in the reaction medium. The activators used in the present invention are generally miscible with the reaction media. The formation of the active complex may be carried out prior, during or after the addition of the monomer. In general, it is preferred to add the titanium tetrahalide solution just prior to the addition of the monomer by injection into the polymerization vessel containing a solution of the other initiator components. The pressure to be employed in the polymerization using the alkali-metal-titanium initiator system may be varied over a wide range from atmospheric pressure to very high pressures of 1,000 atmospheres and above generally; however, pressures from 100 p.s.i. to 15,000 p.s.i. of ethylene are employed in order to facilitate the handling of ethylene and avoid expensive super-pressure equipment. In contrast with other coordination initiator systems, the initiator system of the present invention is most useful in a limited temperature range. It has been found that polymerization rates decrease significantly as the reaction temperature is increased to beyond 150° C. Evidently raising the temperature beyond 150° C. causes the initiating titanium complex to become so reactive that further reaction within the complex, possibly further reduction, detracts from the ability of the catalyst to polymerize ethylene to a high molecular weight polymer. At temperatures below 75° C., the polymerization rate is slow. Apparently it is necessary to have the alkali metal in a molten stage, to cause the reaction of the sodium as above described. The preferred reaction temperature is therefore around 100° C.

In employing the polymerization process of the present invention, titanium compounds sufficiently soluble in organic solvents to give the necessary concentration as a catalyst may be employed generally. Of these compounds, the titanium tetrahalides are preferred, and more specifically titanium tetrachloride. Titanium compounds, such as titanium oxides, have not been found useful in the present invention. The process of this invention has hereinabove been described with reference to titanium tetrahalide as the catalyst component in which the titanium is reduced to a valence state below three. The ability of titanium to exist in such a valence state as to cause the polymerization of ethylene to solid polymers is not unique, but has also been found in other metals such as zirconium, vanadium, tungsten, molybdenum, niobium and tantalum. The catalytic activity of the above said metals, when reduced to a valence state below three, has been described in the following copending applications respectively: S.N. 450,268, filed August 16, 1954; S.N. 455,357, filed September 10, 1954; S.N. 453,145, filed August 30, 1954; S.N. 453,146, filed August 30, 1954; S.N. 457,544, filed September 21, 1954; and S.N. 457,527, filed September 21, 1954. In general, it has been found that coordination catalysts can be formed with transition metals of groups IIIb to VIb of the periodic table. The degree of catalytic activity may vary with each of these metals, the more active ones being the metals listed hereinabove. Thus, the term coordination catalyst is to be construed as applying to the above-listed metals, which are capable of coordinating with ethylene and causing polymerization when existing in a valence state below three. The activators used in the present process can also serve in an analogous manner in a coordination initiator system using a metal compound of the metals described hereinabove, and sodium as the reducing agent. The same conditions and limitations discussed hereinabove for the polymerization of ethylene using a titanium complex, also apply to the metals other than titanium useful in coordination polymerization.

The alkali metals which have been found useful in the present invention are sodium, potassium and lithium. Of these, the sodium is generally preferred mainly because of its lower cost. The alkali metals are used in the present invention in form of a suspension in the polymerization media.

The present invention is further illustrated by the following examples:

*Example I—Polymerization of ethylene using propylene as an activator*

Into a pressure reaction vessel having a capacity of 330 ml. was charged 100 ml. of cyclohexane and 2.3 g. of sodium (0.1 mol). The vessel was cooled and evacuated and 4.2 g. (0.1 mol) of propylene was distilled in. The vessel was then heated to 150° C. for 15 minutes, after which time it was cooled to room temperature. Into the vessel was then injected 3.46 g. (0.02 mol) of titanium tetrachloride dissolved in 40 ml. of cyclohexane. The reaction vessel was heated to 100° C. and pressured with ethylene to 500 to 700 p.s.i. Maintaining that temperature, the reaction vessel was agitated for a period of 1 hour. The vessel was then cooled, excess monomer was vented off, and the resulting polymer was filtered from the reaction medium, washed and dried. 56.3 g. of a solid white polymer was obtained. The polymer could be molded into tough films by heating to 200° C. and pressing at 20,000 p.s.i. for a period of 2 minutes. Infrared analysis indicated the presence of 4 percent of propylene. The density of the polymer was found to be 0.933. The polymerization of ethylene by the above-described technique using essentially same amounts of catalyst, but in the absence of propylene as an activator, yielded only 6.2 g. of polymer, indicating the effectiveness of the activators of the present invention.

*Example II.—Polymerization of ethylene using isobutylene as an activator*

To 100 ml. of cyclohexane 6 g. of isobutylene (0.1 mol) and 2.3 g. of sodium (0.1 mol) were added. The resulting mixture was placed into a pressure reaction vessel having a capacity of 330 ml. and heated to 150° C. for a period of 15 minutes under autogenous pressure. The reaction mixture was cooled to 25° C. and the polymerization mixture was flushed with nitrogen and evacuated. 3.8 g. of titanium tetrachloride dissolved in 40 ml. of cyclohexane was injected into the reaction mixture and the reaction vessel was then pressured to 500 p.s.i. with ethylene and heated to a temperature of 105° C. for 1 hour under continuous agitation. At the outset of the polymerization, the temperature rose to 150° C. because of the exothermic nature of the reaction and polymerization vessel had to be cooled to maintain the reaction temperature of 105° C. After 1 hour, the reaction vessel was cooled to room temperature, excess monomer gas vented off, and the resulting polymer was filtered, washed and dried. Approximately 65 g. of a white solid polymer was obtained. The polymer could be molded into tough, flexible films by heating to 200° C. and pressing under 20,000 p.s.i. pressure for a period of 2 minutes. The density of the resultnig polymer was found to be 0.943. Infrared analysis indicated that no isobutylene had copolymerized with the ethylene.

*Example III.—Polymerization of ethylene using acetylene as the activator*

In a pressure reaction vessel having a capacity of 330 ml., 100 ml. of cyclohexane, 1.1 g. of sodium and 1.5 g. of acetylene were heated under autogenous pressure at 150° C. for a period of 15 minutes after the reaction vessel had been cooled, flushed with $N_2$ and evacuated. The reaction mixture was cooled to room temperature and 0.9 g. of titanium tetrachloride dissolved in 40 ml. of cyclohexane was injected into the reaction mixture. The reaction vessel was pressured to 500 p.s.i. with ethylene and heated to 100° C. for a period of 1 hour under continuous agitation. After 1 hour, the reaction vessel was cooled to room temperature, and the resulting polymer was filtered, washed and dried. 39 g. of a solid polyethylene was obtained. The polymer could be molded into tough, flexible films by heating to 200° C. and pressing under 20,000 p.s.i. pressure. The density of the polymer was found to be 0.968.

*Examples IV–X*

Using the polymerization procedure described in the preceding examples, the activators listed in the table below were tested in the polymerization of ethylene as set forth in the table.

scribed hereinabove. In the absence of the activator under similar conditions, less than 1 g. of polymer was obtained.

*Example XIV*

Using the procedure in Example II, 3.7 g. of titanium tetrabromide dissolved in 40 ml. of cyclohexane was employed instead of the titanium tetrachloride. Upon washing and drying the polymer, 15 g. of a white solid polymer having a density of 0.96 was obtained. The polymer could be molded into a tough, flexible film by the procedure described hereinabove.

The products obtained by polymerizing ethylene with catalysts hereinabove disclosed are solid polymers exclusively and are not contaminated with Friedel-Crafts type of oily polymers. The catalyst system of the present invention is of extreme catalytic reactivity, and, when employing the more active activators such as acetylene, great caution has to be exercised in preventing a rapid rise in temperature during polymerization. Thus, sufficient cooling must be available to counteract the rapid rise of temperature at the start of the polymerization.

The quantity of the catalyst employed can be varied over a rather wide range. It is desirable to employ a catalyst concentration which is at least large enough to produce a reasonably rapid rate for a reasonably long period of time. Suitably, the preferred quantity is within the range of 0.1 to 10% based on the weight of titanium per unit weight of monomer. The quantities of reducing agent and the activator are adjusted accordingly to the quantities of the titanium used. A wide ratio of

| Example | Activator | | Sodium, g. | TiCl₄, g. | React. Temp., °C. | Pressure of Ethylene, p.s.i. | Solvent | | Yield, g. | React. Time, hour | Film Properties | Density | Remarks |
|---|---|---|---|---|---|---|---|---|---|---|---|---|---|
| | Type | Amount (g.) | | | | | Type | cc. | | | | | |
| IV | α-methyl styrene. | 6 | 2.3 | 3.8 | 100 | 500–700 | cyclohexane | 100 | 42 | 1 | tough | 0.9533 | No activator in polymer. |
| V | stilbene | 6 | 2.3 | 3.8 | 100 | 500–1,000 | ___do___ | 140 | 39 | 1 | ___do___ | 0.94 | Do. |
| VI | cis-butene-2 | 6 | 2.3 | 3.8 | 100 | 500–1,000 | ___do___ | 140 | 52 | 1 | ___do___ | 0.94 | |
| VII | cyclohexene | 100 ml. | 2.3 | 3.8 | 100 | 500–1,000 | | | 33.5 | 1 | ___do___ | 0.943 | No cyclohexene in polymer. |
| VIII | ethynyl benzene. | 5 | 2.3 | 3.8 | 100 | 500–1,000 | cyclohexane | 140 | 41.7 | 1 | ___do___ | 0.943 | |
| IX | trans-butene-2 | 6 | 2.3 | 3.8 | 100 | 500–1,000 | ___do___ | 140 | 35.2 | 1 | ___do___ | 0.94 | |
| X | butadiene | 5.4 | 2.3 | 3.8 | 100 | 500–1,000 | ___do___ | 140 | 32 | 1 | ___do___ | 0.956 | |

*Example XI*

Using the procedure in Example II, 3.8 g. of zirconium tetrachloride dissolved in 40 ml. of cyclohexane was employed instead of the solution of titanium tetrachloride. Upon washing and drying the polymer, 26 g. of a white solid polymer having a density of 0.948 was obtained. The polymer could be molded into tough, flexible films by the procedure described hereinabove.

*Example XII*

Using the procedure described in Example II, 2.3 g. of lithium and 6 g. of butene-1 were dissolved in 100 ml. of cyclohexane instead of the sodium and the isobutylene. Upon washing and drying the polymer, 55 g. of a white solid polymer having a density of 0.938 was obtained. The polymer could be molded into tough, flexible films by the procedure described hereinabove. In the absence of the activator, 14 g. of a lower molecular weight polymer was obtained under similar conditions.

*Example XIII*

Using the procedure described in Example II, 4 g. (0.1 mol) of potassium and 6 g. of butene-1 were dissolved in 100 ml. of cyclohexane instead of the sodium and the isobutylene. Upon washing and drying the polymer, 9 g. of a white, solid polymer was obtained. The polymer could be molded into tough, flexible films by the procedure dereducing agent and activator may be employed. However, a preferred ratio of activator and alkali metal to the titanium is the molar ratio of activator : alkali metal: titanium tetrahalide of 1:1:0.2. A further decrease in the quantities of the alkali metal and activator causes a significant decrease in the rate of polymerization of ethylene. Substantially, no significant increase in the rate of polymerization is noticed if either activator content or the quantity of the reducing agent is increased.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric acid mixture in a Waring Blendor several times, followed by washing with acetone, and thereafter, if necessary, followed by several acetone-aqueous sodium hydroxide washes, and finally by acetone-water wash. Other methods of purifying the polymer will occur to those skilled in the art.

Although the process of this invention has been described in reference to homopolymers of ethylene, it is to be understood that it equally well applies to the copolymerization of ethylene with comonomers such as propylene and other ethylenically unsaturated monomers. It is quite possible that the comonomer used is at the same time the activator for the catalyst system. As stated hereinabove, excess quantities of the activator in no way affect the polymerization rates adversely.

The ethylene polymers obtained in accordance with the process of this invention are highly useful in numerous applications, especially in the form of films, extruded articles, extruded insulation on wire, fibers and filaments, etc. In certain applications it may be beneficial to retain the titanium in the polymer to impart greater heat stability to the polymer.

We claim:

1. The process for preparing a homopolymer of ethylene which comprises contacting ethylene with a polymerization initiator in an inert, liquid hydrocarbon medium at a temperature below 150° C., said initiator consisting essentially of the reaction product obtained on admixing a metal halide of the class consisting of titanium halides and zirconium halides, said halides being selected from the group consisting of bromides and chlorides, with an alkali metal and a member of the class consisting of hydrocarbons having a triple bond between carbon atoms and hydrocarbons of molecular weight higher than ethylene, having at least one non-benzenoid ethylenic bond, said alkali metal being present in sufficient quantities to reduce the metal of said metal halide to a valence state below three and said hydrocarbon being present in at least equimolar quantities of said alkali metal, and recovering a solid polymer of ethylene.

2. The process for preparing a homopolymer of ethylene which comprises contacting ethylene with a polymerization initiator in an inert, liquid hydrocarbon medium at a temperature below 150° C., said initiator consisting essentially of the reaction product obtained on admixing a titanium halide, said halide being selected from the group consisting of bromides and chlorides, with an alkali metal and a member of the class consisting of hydrocarbons having a triple bond between carbon atoms and hydrocarbons of molecular weight higher than ethylene having at least one non-benzenoid ethylenic bond, said alkali metal being present in sufficient quantities to reduce said titanium to a valence state below three and said hydrocarbon being present in at least equimolar quantities of said alkali metal, and recovering a solid polymer of ethylene.

3. The process of polymerizing ethylene in an inert, liquid hydrocarbon medium at a temperature of 75° to 150° C., in the presence of an initiator system consisting essentially of the product formed by admixing titanium tetrachloride with an alkali metal and a hydrocarbon having a triple bond between carbon atoms, said alkali metal being present in sufficient quantities to reduce said titanium to a valence state below three and said hydrocarbon being present in at least equimolar quantities of said alkali metal, and recovering a solid polymer of ethylene.

4. The process as set forth in claim 3 wherein the hydrocarbon component having a triple bond between carbon atoms is acetylene.

5. The process as set forth in claim 3 wherein the hydrocarbon component having a triple bond between carbon atoms is phenyl acetylene.

6. The process of polymerizing ethylene in an inert, liquid hydrocarbon medium at a temperature of 75° to 150° C., in the presence of an initiator system consisting essentially of the product formed by admixing titanium tetrachloride with an alkali metal and a hydrocarbon having at least one non-benzenoid ethylenic bond and having at least three carbon atoms, said alkali metal being present in sufficient quantity to reduce said titanium to a valence state below three and said hydrocarbon being present in at least equimolar quantities of said alkali metal, and recovering a solid polymer of ethylene.

7. The process as set forth in claim 6 wherein the hydrocarbon having an ethylenic double bond comprises ethylene substituted with one to three aromatic hydrocarbon radicals.

8. The process as set forth in claim 7 wherein the hydrocarbon is stilbene.

9. The process as set forth in claim 6 wherein the hydrocarbon comprises isobutylene.

10. The process as set forth in claim 6 wherein the activator comprises butadiene.

11. The process of polymerizing ethylene which comprises adding to an inert organic solvent at a temperature of 75° to 150° C., said solvent containing an initiator system consisting essentially of the product formed by admixing titanium tetrachloride, an alkali metal, and acetylene in a molar weight ratio of 0.2/1/1, and recovering a solid polymer of ethylene.

12. A process as set forth in claim 11 wherein the organic solvent is cyclohexane.

References Cited in the file of this patent

UNITED STATES PATENTS

| | | |
|---|---|---|
| 2,691,647 | Field et al. | Oct. 12, 1954 |
| 2,700,663 | Peters | Jan. 25, 1955 |
| 2,710,854 | Seelig | June 14, 1955 |
| 2,721,189 | Anderson et al. | Oct. 18, 1955 |